Figures 1, 2:
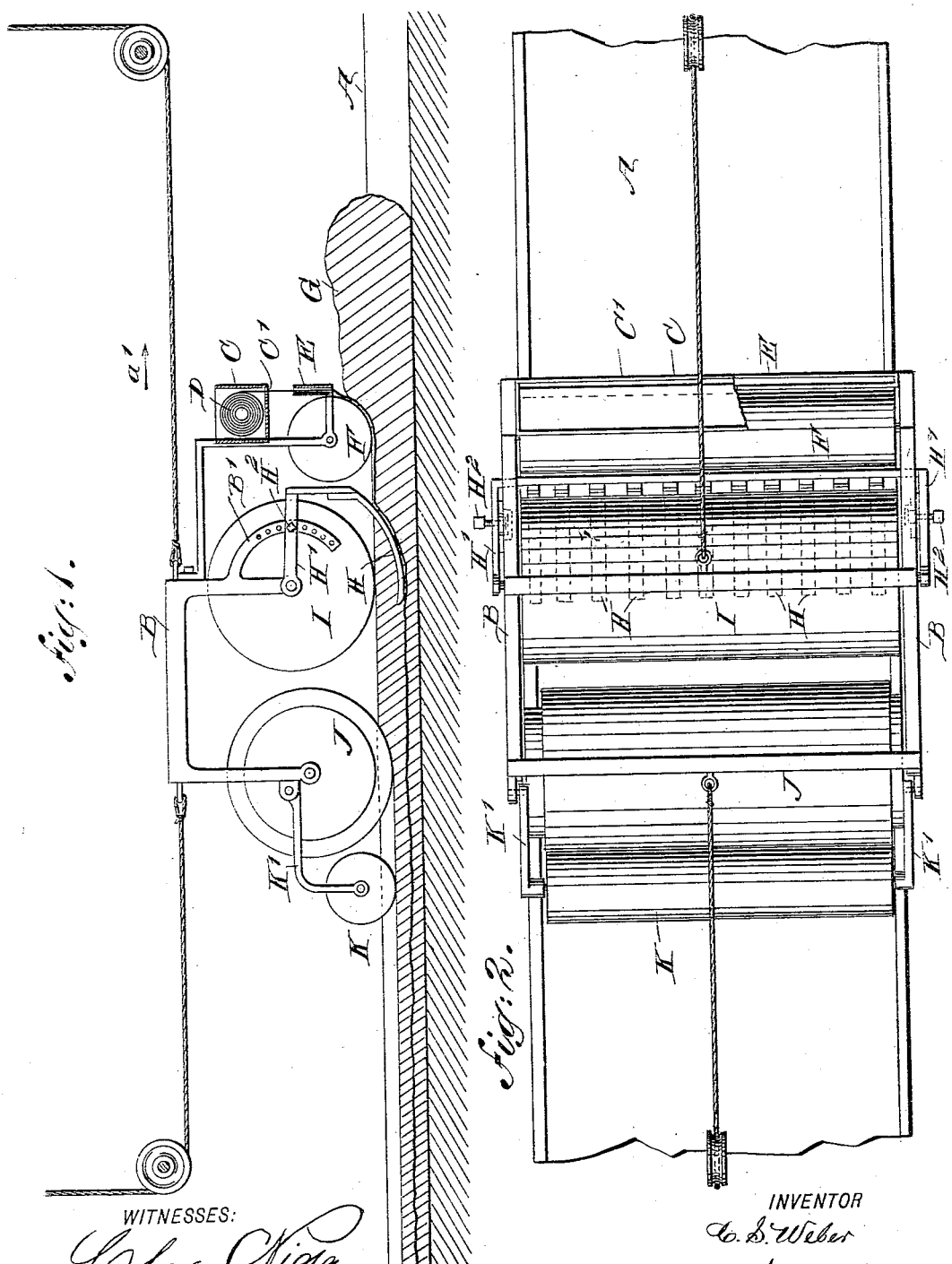

(No Model.)

C. S. WEBER.
MANUFACTURE OF WIRE GLASS.

No. 555,351. Patented Feb. 25, 1896.

WITNESSES:
Chas. Nisa.
Theo. G. Hoster.

INVENTOR
C. S. Weber
BY Munn & Co.
ATTORNEYS.

UNITED STATES PATENT OFFICE.

CARL S. WEBER, OF NEW YORK, N. Y.

MANUFACTURE OF WIRE-GLASS.

SPECIFICATION forming part of Letters Patent No. 555,351, dated February 25, 1896.

Application filed April 5, 1894. Serial No. 506,482. (No model.)

*To all whom it may concern:*

Be it known that I, CARL S. WEBER, of the city, county, and State of New York, have invented certain new and useful Improvements in the Manufacture of Wire-Glass, of which the following is a full, clear, and exact description.

The invention relates to machines for embedding wire-netting in glass, and its object is to provide certain new and useful improvements in the manufacture of glass, whereby the wire-netting is uniformly and evenly embedded in the glass to produce a high-grade article for use in skylights and other places and for other purposes.

The invention is embodied in the improved machine hereinafter described. As the operation is carried out, the molten glass is first poured upon a table in sufficient quantity to form a sheet of due thickness. Then wire-netting is fed to the glass and simultaneously subjected to a rolling pressure to force the glass positively into the meshes of the netting. Next the wire is pressed completely beneath the surface of the glass, which is finally rolled.

Reference is to be had to the accompanying drawings, forming a part of this specification, in which similar letters of reference indicate corresponding parts in both figures.

Figure 1 is a sectional side elevation of the improvement, and Fig. 2 is a plan view of the same with parts broken out.

The machine is provided with a table A of the usual construction, on which the molten glass is poured, and treated as hereinafter more fully described. Over this table A is arranged a carriage B adapted to be moved forward and backward either by hand or by power, as desired.

On the front end of the carriage B is arranged a transversely-extending box C adapted to contain a roll of wire-netting D, journaled in suitable bearings in the ends of the box, so that the wire-netting readily unwinds and passes down through an opening C' in the bottom of the box to a feed-guide E, arranged transversely and secured on the carriage B directly under and in alignment with the opening C'. The wire-netting after leaving the feed-guide E passes onto the peripheral surface of a roller F, journaled in suitable bearings in the carriage B and adapted to move forward with the same so as to subject the wire-netting to a rolling pressure to positively force the wire-netting into the molten glass G poured on the said table, as indicated in Fig. 1.

As the carriage B moves forward in the direction of the arrow $a'$, the roller F, by engaging the downwardly-moving wire-netting, forces the latter onto the glass in front of the said roller so that the molten glass fills all the meshes of the wire-netting, and at the same time rolls out the surplus material in front to finally leave the wire-netting in the top of the smoothed-out glass in the rear, as will be readily understood by reference to Fig. 1. The wire-netting is then acted on by shoes H, arranged longitudinally one alongside the other and curved downwardly and rearwardly, as plainly indicated in Fig. 1. The shoes H press the already partially embedded wire-netting beneath the surface of the glass to a desired depth. Directly above the shoes H is arranged a pressing-roller I journaled in suitable bearings in the carriage B, the said pressing-roller rolling out the already smoothed glass to prevent the wire-netting from moving upward into its previous position.

In order to embed the wire-netting the desired distance below the surface of the glass, I prefer to fasten the shoes H on a frame H', hung loosely on the shaft of the roller I, the said frame being adapted to be secured in place by bolts $H^2$, adapted to engage one of a series of apertures in a segment B', forming part of the carriage B, the center of the segment being in the center of the shaft of the roller I.

In order to finally roll the glass, I provide the second roller J, journaled in suitable bearings in the carriage B, and in order to finally smooth the glass I provide a finishing-roller K, hung in a frame K' pivoted on the carriage B. The rollers I and F have their under surfaces preferably in the same horizontal plane, while the roller J has its under surface preferably in a horizontal plane located below the horizontal plane of the rollers I and F.

Now by adjusting the shoes H the wire-netting can be embedded in the glass about midway of its thickness, as indicated in Fig. 1, after the final pressing-roller J has acted on the glass. When the carriage B has come near the outer end of its stroke, then the operator, either by hand or machine, cuts the wire-netting below the feed-guide E, so that the length of the wire-netting embedded in the glass corresponds to the length of the sheet of glass to be made.

After the sheet is finished and removed from the table A the carriage B is returned to the starting-point, and the above-described operation is repeated—that is, the wire-netting is unwound from the roll D, passed through the guide E to the peripheral surface of the roller F, to be subjected to a rolling pressure on the forward movement of the carriage, so as to press the wire-netting upon the glass in front of the roller F and cause the glass to embed itself in the meshes of the netting. The wire-netting is then pressed below the surface by the shoes H, and then the glass is rolled, and finally finished in the manner previously described.

If desired, the box containing the roll of wire-netting, or the latter itself, can be heated from suitable burners carried by the carriage.

Having thus fully described my invention, I claim as new and desire to secure by Letters Patent—

1. In a machine for manufacturing wire-glass, the combination with a carriage adapted to be moved over a table containing the molten glass, of a wire feed and pressing roller journaled in the front part of the said carriage, a pressing-roller journaled in the said carriage in the rear of the said feed and pressing roller, and shoes suspended from the carriage and intermediate the said rollers, substantially as described.

2. In a machine for manufacturing wire-glass, a carriage adapted to be moved over a table, a wire feed and pressing roller journaled in the carriage, shoes in the rear of the said roller to press the wire-netting below the surface of the glass, and a pressing-roller above the said shoes and journaled in the said carriage, substantially as shown and described.

3. In a machine for manufacturing wire-glass, a carriage adapted to be moved over a table, a wire feed and pressing roller journaled in the carriage, shoes in the rear of the said roller to press the wire-netting below the surface of the glass, a box or other support for the roll of wire-netting and arranged on the said carriage, and a feed-guide through which passes the wire-netting onto the peripheral surface of the said first-named roller, substantially as shown and described.

4. A machine for manufacturing wire-glass, provided with a reciprocating carriage adapted to support a roll of wire-netting, a feed-guide held on the said carriage, and a front pressing-roller, onto the peripheral surface of which the wire-netting is fed by the said feed-guide, to feed the wire to the glass and fill its meshes with molten glass and shoes in the rear of the said pressing-roller to press the wire beneath the surface of the glass, substantially as shown and described.

5. A machine for making wire-glass, comprising a carriage adapted to support a roll of wire-netting, a feed-guide on the said carriage, a front roller onto the peripheral surface of which the wire-netting is fed by the said guide, adjustable shoes held on the said carriage, a pressing-roller over the said shoes in the rear of the first-named roller, and a third roller journaled in the said carriage and having its under surface below the under surfaces of the said first-named rollers, substantially as shown and described.

6. A machine for making wire-glass, comprising a carriage adapted to support a roll of wire-netting, a feed-guide on the said carriage, a front roller onto the peripheral surface of which the wire-netting is fed by the said guide, adjustable shoes held on the said carriage, a pressing-roller over the said shoes in the rear of the first-named roller, a third roller journaled in the said carriage and having its under surface below the under surfaces of the said first-named rollers, and a finishing-roller journaled in a frame pivoted on the said carriage and extending in the rear of the last-named roller, substantially as shown and described.

CARL S. WEBER.

Witnesses:
   THEO. G. HOSTER,
   C. SEDGWICK.